(12) United States Patent
Kim (10) Patent No.: US 11,473,762 B2
(45) Date of Patent: Oct. 18, 2022

(54) LUMINAIRE APPARATUS HAVING AIR CLEANER ATTACHED THERETO, WHICH IS CONNECTED BY WIRES AND CABLES SO AS TO BE VERTICALLY MOVABLE

(71) Applicant: SUNGJINHITEC CO., LTD., Ulsan (KR)

(72) Inventor: Wi Chul Kim, Ulsan (KR)

(73) Assignee: SUNGJINHITEC CO., LTD., Ulsan (KR)

( * ) Notice: Subject to any disclaimer, the term of this patent is extended or adjusted under 35 U.S.C. 154(b) by 0 days.

(21) Appl. No.: 17/483,071

(22) Filed: Sep. 23, 2021

(65) Prior Publication Data
US 2022/0196226 A1 Jun. 23, 2022

(30) Foreign Application Priority Data
Dec. 18, 2020 (KR) .................... 10-2020-0178349

(51) Int. Cl.
| | |
|---|---|
| *F21V 21/16* | (2006.01) |
| *F24F 13/078* | (2006.01) |
| *B01D 46/42* | (2006.01) |
| *F21V 21/15* | (2006.01) |
| *F21V 33/00* | (2006.01) |
| *G01D 5/14* | (2006.01) |
| *G01P 3/481* | (2006.01) |

(52) U.S. Cl.
CPC .......... *F21V 21/16* (2013.01); *B01D 46/4227* (2013.01); *B01D 46/4245* (2013.01); *F21V 21/15* (2013.01); *F21V 33/00* (2013.01); *F24F 13/078* (2013.01); *B01D 2279/40* (2013.01); *G01D 5/145* (2013.01); *G01P 3/481* (2013.01)

(58) Field of Classification Search
CPC .......... F21V 21/15; F21V 21/16; F21V 21/18; F21V 21/20; F21V 33/0088–0096; F21S 8/06; F24F 13/078
See application file for complete search history.

(56) References Cited

FOREIGN PATENT DOCUMENTS

| CN | 108006529 A | * | 5/2018 | |
|---|---|---|---|---|
| KR | 20-0326792 Y1 | | 9/2003 | |
| KR | 10-1658334 B1 | | 9/2016 | |
| WO | WO-2021025231 A | * | 2/2021 | .............. F21V 21/36 |

* cited by examiner

*Primary Examiner* — Sean P Gramling
(74) *Attorney, Agent, or Firm* — Novick, Kim & Lee, PLLC; Jae Youn Kim (57) ABSTRACT

Disclosed herein is a luminaire apparatus having an air cleaner attached thereto, which is connected by wires and cables so as to be vertically movable. More particularly, the luminaire apparatus enables a luminaire and air cleaner, which are considerably heavy, installed on a ceiling to be safely moved vertically using wires in order to perform replacement of light bulbs, replacement of air cleaner filters, troubleshooting, or maintenance, and is usable through supply of power to the luminaire and the air cleaner at a desired height by installing the air cleaner capable of vertically moving together with the luminaire and by installing power cables capable of supplying power even when the luminaire and the air cleaner are moved up and down.

4 Claims, 14 Drawing Sheets

LUMINAIRE APPARATUS HAVING AIR CLEANER ATTACHED THERETO, WHICH IS CONNECTED BY WIRES AND CABLES SO AS TO BE VERTICALLY MOVABLE

BACKGROUND OF THE INVENTION

Field of the Invention

The present invention relates to a luminaire apparatus having an air cleaner attached thereto, which is connected by wires and cables so as to be vertically movable. More particularly, the present invention relates to a luminaire apparatus having an air cleaner attached thereto, which enables a luminaire and air cleaner, which are considerably heavy, installed on a ceiling to be safely moved vertically using wires in order to perform replacement of light bulbs, replacement of air cleaner filters, troubleshooting, or maintenance, and which is usable through supply of power to the luminaire and the air cleaner at a desired height by installing the air cleaner capable of vertically moving together with the luminaire and by installing power cables capable of supplying power even when the luminaire and the air cleaner are moved up and down.

Description of the Related Art

In general, elevated luminaires are installed and used in places with relatively high ceilings, such as gymnasiums, distribution centers, industrial facilities, performance halls, and indoor buildings.

Such luminaires operate without problems when used at first, but, upon long-term use, light bulbs thereof need to be replaced periodically due to the limited lifespan thereof. Moreover, periodic management of the luminaires is required along with inspection for troubleshooting and maintenance.

In order to inspect or replace the light bulbs of the luminaires installed and used on the high ceilings, due to the nature of the installation thereof, elevated work is carried out using separate elevated work equipment, such as an elevated work platform, a crane or ladder truck for enabling elevated work, or the like.

Elevated work such as that described above requires a higher degree of attention and skill than when working on the ground. In addition, the elevated work has a problem in that a worker is always exposed to the risk of accidents such as electric shocks and falls during elevated work, as well as increased expenses due to the use of elevated work equipment.

Korean Utility Model No. 20-0326792 discloses a luminaire elevating device.

However, because the conventional luminaire elevating device is connected to the central portion of a luminaire by a single elevating wire, an accident may occur when, for example, the elevating wire twists while the luminaire is rotated by the driving of the luminaire elevating device.

In order to solve this issue, Korean Patent No. 10-1658334 discloses a luminaire elevating device that is installed in a structure to support a luminaire while allowing the luminaire to vertically move, including: a connection part connected to the luminaire; a body part disposed above the connection part and including a drive motor and a pulley connected to the drive motor; a support part installed on the structure and having a space defined therein to accommodate the body part; a wire configured to connect the connection part to the body part and to allow the luminaire to move up or down together with the connection part while being wound or unwound around the pulley according to the driving of the drive motor; and a plurality of guide rollers provided in the connection part, the guide rollers being supported by the wire and connecting the connection part to the wire, the guide rollers being configured to guide the unwinding or winding of the wire, wherein the wire has one end connected so as to be wound or unwound around the pulley and the other end connected to the body part so that the connection part is connected to the both ends by the guide rollers and is supported in parallel.

However, in the case of the above patent, power is supplied to the luminaire only when the connection part is moved up for coupling to the body part, whereas the supply of power to the luminaire is cut off when the connection part is separated from the body part. Hence, the use of the luminaire is greatly restricted, for example, in that the luminaire is moved down only for replacement and repair of the luminaire and the luminaire may not be turned on in the state in which it is moved down to a height desired by the user.

Therefore, there is a need to develop a luminaire apparatus that enables a luminaire to be turned on after vertical movement to a desired height, even if the luminaire is not fully moved up.

PATENT DOCUMENT (Patent Document 1) Korean Utility Model No. 20-0326792
(Patent Document 2) Korean Patent No. 10-1658334

SUMMARY OF THE INVENTION

Therefore, the present invention has been made in view of the above problems, and it is an object of the present invention to provide a luminaire apparatus having an air cleaner attached thereto, which enables a luminaire and air cleaner, which are considerably heavy, installed on a ceiling to be safely moved vertically using wires in order to perform replacement of light bulbs, replacement of air cleaner filters, troubleshooting, or maintenance, and which is usable through supply of power to the luminaire and the air cleaner at a desired height by installing the air cleaner capable of vertically moving together with the luminaire and by installing power cables capable of supplying power even when the luminaire and the air cleaner are moved up and down.

It is another object of the present invention to provide a luminaire apparatus having an air cleaner attached thereto, which is connected by wires and cables so as to be vertically movable. The luminaire apparatus can supply power to a luminaire through elevatable power cables while supplying power to the luminaire through separate power lines when the luminaire is fully moved up so that a connection unit is coupled to a body unit, thereby preventing accidents such as fires due to excessive use of electric power through the wound power cables.

It is a further object of the present invention to provide a luminaire apparatus capable of improving an enclosed indoor environment such as a gymnasium by installing an air cleaner between a body unit and a luminaire.

The present invention is not limited to the above-mentioned objects, and other objects of the present invention can be clearly understood by those skilled in the art to which the present invention pertains from the following description.

In accordance with the present invention, the above and other objects can be accomplished by the provision of a luminaire apparatus that includes a body unit including a casing installed on a structure and a lower casing coupled to a lower portion of the casing, a wire elevating unit installed in the body unit, a power cable elevating unit installed in the body unit, a connection unit installed beneath the body unit so as to be vertically movable, an electronic device coupled to an underside of the connection unit and configured as at least one of an air cleaner, a humidifier, a speaker, and an imaging device, a luminaire coupled to an underside of the electronic device, a wire configured to connect the wire elevating unit to the connection unit in order to vertically move the electronic device and the luminaire, and a power cable having one end connected to the power cable elevating unit and the other end connected to the electronic device and the luminaire, the power cable being moved up and down along with the movement of the electronic device and the luminaire.

The wire elevating unit may include a first drive motor installed in the body unit and a wire wheel rotatably connected to the first drive motor, the wire being wound around the wire wheel. The power cable elevating unit may include a second drive motor installed in the body unit and a power cable wheel rotatably connected to the second drive motor, the power cable being wound around the power cable wheel. The second drive motor for rotating the power cable wheel may be controlled to rotate in response to a rotational speed or number of revolutions of the first drive motor.

The lower casing and the connection unit may have a plug supplied with power from the outside and a socket to which the plug is fitted, respectively. When the connection unit moves up to be coupled to the lower casing, the plug may be connected to the socket so that external power is supplied to the luminaire through a power line connected to the socket and the luminaire. The power cable may consist of a pair of first power cables connected to the electronic device and a pair of second power cables connected to the luminaire. The power cable may be controlled so that power is supplied to the luminaire through the second power cables only when the connection unit moves down and the plug is separated from the socket so that the supply of power to the luminaire through the power line is cut off.

The body unit may further include a support panel configured to divide the casing into upper and lower portions. The support panel may be provided with an insertion port into which a portion of a power cable wheel is inserted, and has a plurality of wheel shaking prevention guide members installed on left and right sides of the insertion port in order to prevent the power cable wheel from shaking from side to side during rotation. The support panel may be equipped with a weight sensing spring coupled to one end of the wire, a micro switch configured to turn on and off a first or second drive motor, and an operation bar having one end fixed to an upper end of the weight sensing spring and the other end pressing a motor control button provided on an upper end of the micro switch. When weight of the electronic device and the luminaire is applied to the weight sensing spring through the wire, the operation bar may press the motor control button of the micro switch while the weight sensing spring is contracted, thereby keeping the first and second drive motors operated. When the weight of the electronic device and the luminaire is not applied to the weight sensing spring through the wire or is reduced, the operation bar may not press the motor control button of the micro switch while the contracted weight sensing spring is extended, thereby controlling the first and second drive motors so as not to operate.

The wire elevating unit may have a magnetic Hall sensor installed on one side thereof, and a plurality of magnetic switches are installed on a gear section installed at one end of a first drive motor to detect a rotational speed or number of revolutions of the first drive motor, thereby enabling the first drive motor to be controlled to automatically stop in case of an emergency or to be controlled to set a height to which the electronic device and the luminaire are moved downwards. A second drive motor for rotating a power cable wheel may be controlled to rotate in response to the rotational speed or number of revolutions of the first drive motor detected by the magnetic Hall sensor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Exemplary embodiments of the present invention will be described below in detail with reference to the accompanying drawings.

In certain embodiments, detailed descriptions of constructions or functions well known in the art may be omitted to avoid obscuring appreciation of the invention by a person of ordinary skill in the art. In addition, the terms used herein are terms defined in consideration of functions of the present invention, and these terms may change depending on the intention or practice of a user or an operator. Therefore, these terms should be defined based on the entirety of the disclosure set forth herein.

Referring to FIGS. 1 to 13, a luminaire apparatus 100 according to the present invention includes a body unit 110 installed on a structure, a wire elevating unit 120 installed in the body unit 110, a power cable elevating unit 130 installed in the body unit 110, a connection unit 150 installed beneath the body unit 110 so as to be vertically movable, an electronic device 160 coupled to the underside of the connection unit 150 and configured as at least one of an air cleaner, a humidifier, a speaker, an imaging device, and the like, a luminaire 170 coupled to the underside of the electronic device 160, a wire W configured to connect the wire elevating unit 120 to the connection unit 150 in order to move the electronic device 160 and the luminaire 170 vertically, and a power cable C having one end connected to the power cable elevating unit 130 and the other end connected to the electronic device 160 and the luminaire 170, thereby enabling the supply of power to the electronic device capable of vertically moving together with the luminaire even when they are moved up and down.

The electronic device 160 of the present invention is fixed to the connection unit 150 by a fixed frame 161, and the fixed frame 161 has a ring 162 formed at the upper end thereof to be detachably coupled to a ring 152 of the connection unit 150. The electronic device 160 and the luminaire 170 are coupled to each other via a bracket 171.

The electronic device 160 may be exemplified as an air cleaner, but the present invention is not limited thereto. For example, other electronic devices such as a humidifier, a speaker, and an imaging device may be installed.

The body unit 110 of the present invention may generally include a casing 111, a lower casing 115 coupled to the lower portion of the casing 111, a support panel 113 configured to divide the casing 111 into upper and lower portions, and a plurality of support bars 114.

The casing 111 has an internal space defined to accommodate the wire elevating unit 120 and the power cable elevating unit 130 therein, and has a ring 111a installed at the upper end thereof for fixing to the structure.

The support panel 113 serves to support the wire elevating unit 120 and the power cable elevating unit 130, and may have an insertion port 113a into which a power cable wheel 133 of the power cable elevating unit 130 to be described later is inserted.

The support panel 113 is provided with the insertion port 113a into which a portion of the power cable wheel 133 is inserted. The support panel 113 may have a plurality of wheel shaking prevention guide members 113b installed on the left and right sides of the insertion port 113a in order to prevent the power cable wheel 133 from shaking from side to side during rotation.

The support bars 114 are installed through the support panel 113, and each have an upper end fixed to the casing 111 and a lower end fixed to the lower casing 115.

The lower casing 115 is detachably coupled to the lower portion of the casing 111, and has holes 117a and 117b formed therein to allow the wire W and the power cable C to be drawn out, respectively. The lower casing 115 may be provided with a plug 119, a locking unit 116, and a coupling sensing switch 118.

The locking unit 116 serves to securely bind a locking ring 151 of the connection unit 150 to be described later and to fix a lighting lamp so that the lighting lamp does not fall even in an emergency such as when the wire W is loosened. The locking unit 116 consists of a pair of left and right locking units.

The locking unit 116 may have therein an insertion hole 116a through which the locking ring 151 provided in the connection unit 150 is insertable, and may include, for example, a switching bar formed to open and close the insertion hole 116a and a solenoid valve formed to open or close the insertion hole 116a.

The coupling sensing switch 118 detects that the lowered connection unit 150 rises to be coupled to the lower casing 115 of the body unit 110, and serves to stop operation of a first drive motor 121 of the wire elevating unit 120 and a second drive motor 131 of the power cable elevating unit 130. To this end, the connection unit 150 has a pressing piece 156 formed to stop the operation of the drive motors 121 and 131 by pressing the coupling sensing switch 118.

The support panel 113 is equipped with a weight sensing spring 125 coupled to one end of the wire W, a micro switch 126 configured to turn on and off the first or second drive motor 121 or 131, and an operation bar 127 having one end fixed to the upper end of the weight sensing spring 125 and the other end pressing a motor control button 126a provided on the upper end of the micro switch 126.

When the weight of the electronic device 160 and the luminaire 170 is applied to the weight sensing spring 125 via the wire W, the operation bar 127 presses the motor control button 126a of the micro switch 126 while the weight sensing spring 125 is contracted, thereby continuing operation of the first and second drive motors 121 and 131.

On the other hand, when the weight of the electronic device and the luminaire is not applied to the weight sensing spring through the wire or is reduced, such as when the luminaire falls to the floor or the electronic device or the luminaire is separated for replacement, the operation bar does not press the motor control button of the micro switch while the contracted weight sensing spring is extended, so the first and second drive motors are controlled so as not to operate.

The wire elevating unit 120 of the present invention includes the first drive motor 121 installed in the body unit 110 and a wire wheel 123 rotatably connected to the first drive motor 121, the wire being wound around the wire wheel 123.

The wire W is wound around the wire wheel 123, and is then drawn out through the hole 117a of the lower casing via a wire alignment device 140, which will be described later, to be fastened to a pair of guide rollers provided in the connection unit 150. Subsequently, the wire W is inserted back into the body unit through the hole 117a of the lower casing, and is then fixed at the end thereof to the weight sensing spring 125.

When the wire wheel 123 rotates, the connection unit 150, together with the electronic device 160 and luminaire 170 fixed to the connection unit 150, are moved up and down while the wire W is wound and unwound.

The power cable elevating unit 130 of the present invention includes the second drive motor 131 installed in the body unit 110 and the power cable wheel 133 rotatably connected to the second drive motor 131, the power cable C being wound around the power cable wheel 133.

A rotation overload prevention bearing 134 may be installed at a connection portion between the power cable wheel 133 and the second drive motor 131.

However, it is preferable to control the second drive motor 131, for rotating the power cable wheel 133, to rotate in response to the rotational speed or number of revolutions of the first drive motor 121. This is to allow the power cable C to move up or down according to the speed at which the wire W is raised or lowered when the wire W is moved up or down by the wire wheel 123.

The power cable C consists of a pair of first power cables C1 connected to the electronic device 160 and a pair of second power cables C2 connected to the luminaire 170. A total of 4 cables such as the first and second power cables may, for example, be integrally coated with a material such as rubber to form a flat structure. If each of the power cables is configured to have a flat structure as described above and to have a width corresponding to that of the power cable wheel, the power cable may be prevented from becoming twisted or tangled while being wound or unwound.

The connection unit 150 of the present invention is disposed beneath the body unit 110 and is moved up and down by winding and unwinding the wire W. The ring 152 is installed at the lower end of the connection unit 150 and is coupled to the ring 162 provided at the upper end of the fixed frame 161 to support the electronic device.

The connection unit 150 is provided with the pair of locking rings 151 for fixing to the lower casing 115 as described above.

Figure 11:
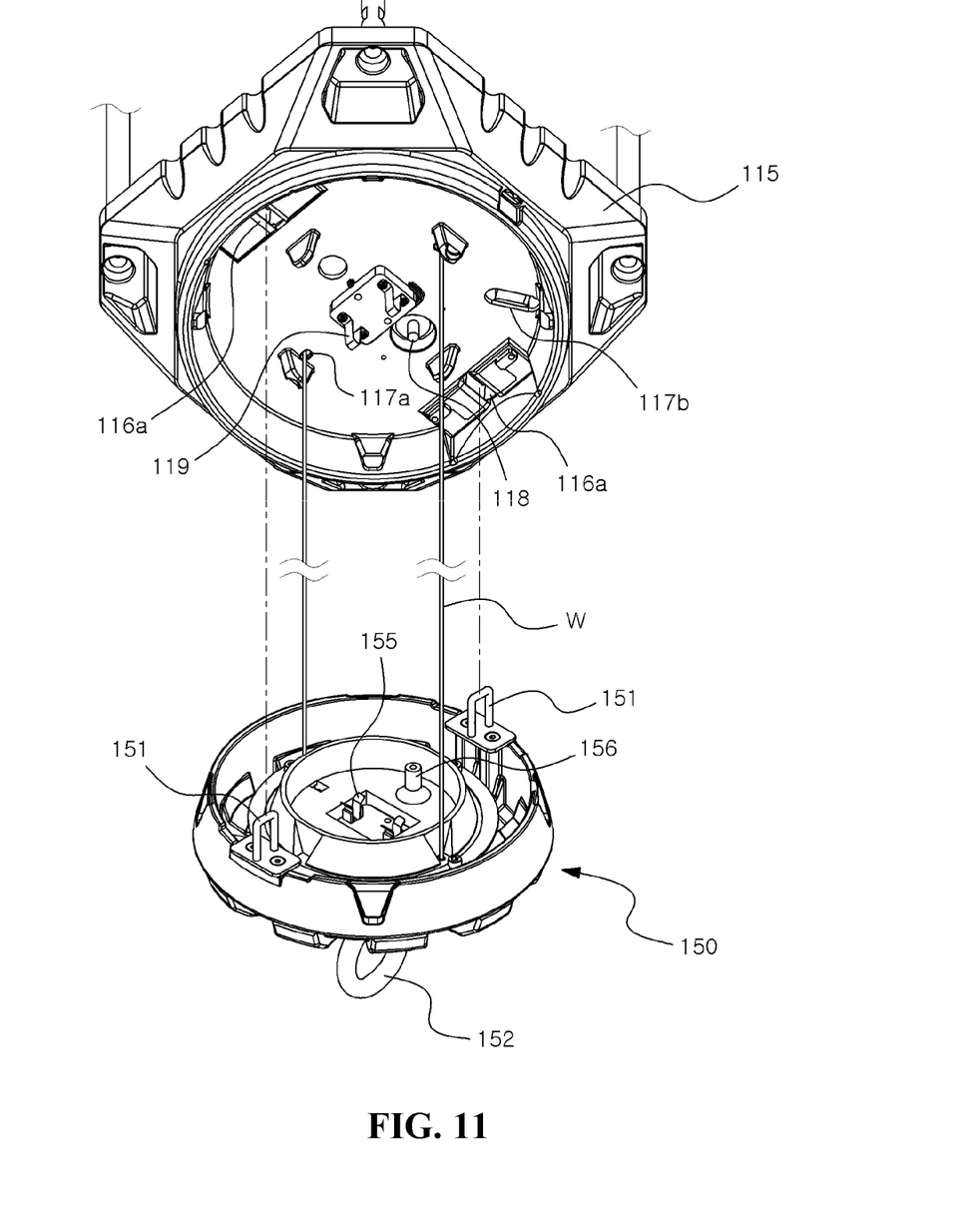
FIG. 11 is a view illustrating a structure of a lower casing and a connection unit of the present invention.

The lower casing 115 and the connection unit 150 have a plug 119 supplied with power from the outside and a socket 155 into which the plug 119 is fitted, respectively.

When the connection unit 150 moves up to be coupled to the lower casing 115, the plug 119 is connected to the socket 155 so that external power is supplied to the luminaire 170 through a power line P connected to the socket 155 and the luminaire 170. When power is supplied to the luminaire 170 through the power line P, the supply of power to the luminaire 170 through the power cable C is cut off.

The power cable C is wound around the power cable wheel 133 with the connection unit 150 coupled to the body unit 110, in which state when the luminaire that consumes a lot of electric power is used for a long time, the power cable wound around the power cable wheel overheats, which leads to an increased risk of fire.

Accordingly, the present invention adopts a method in which when the power line is installed separately from the power cable and the connection unit is coupled to the body unit, power is supplied from the power line to the luminaire through the contact where the socket is coupled to the plug, whereas power is supplied through the power cable when the connection unit moves down to be separated from the body unit.

On the other hand, in the case of an electronic device that consumes less electric power than the luminaire, there is no safety problem even if power is supplied from the power cable at all times, thereby obviating a separate power line.

Figure 1:
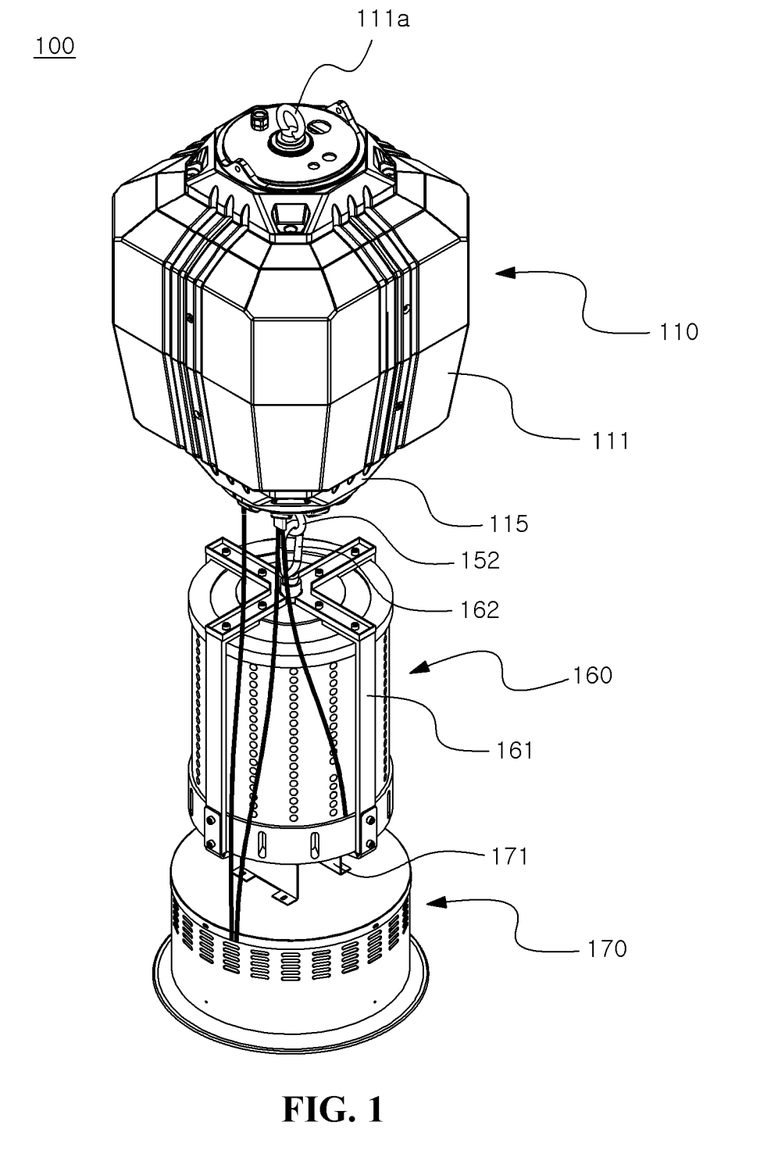
FIG. 1 is a perspective view illustrating a luminaire apparatus of the present invention.
Figure 2A:
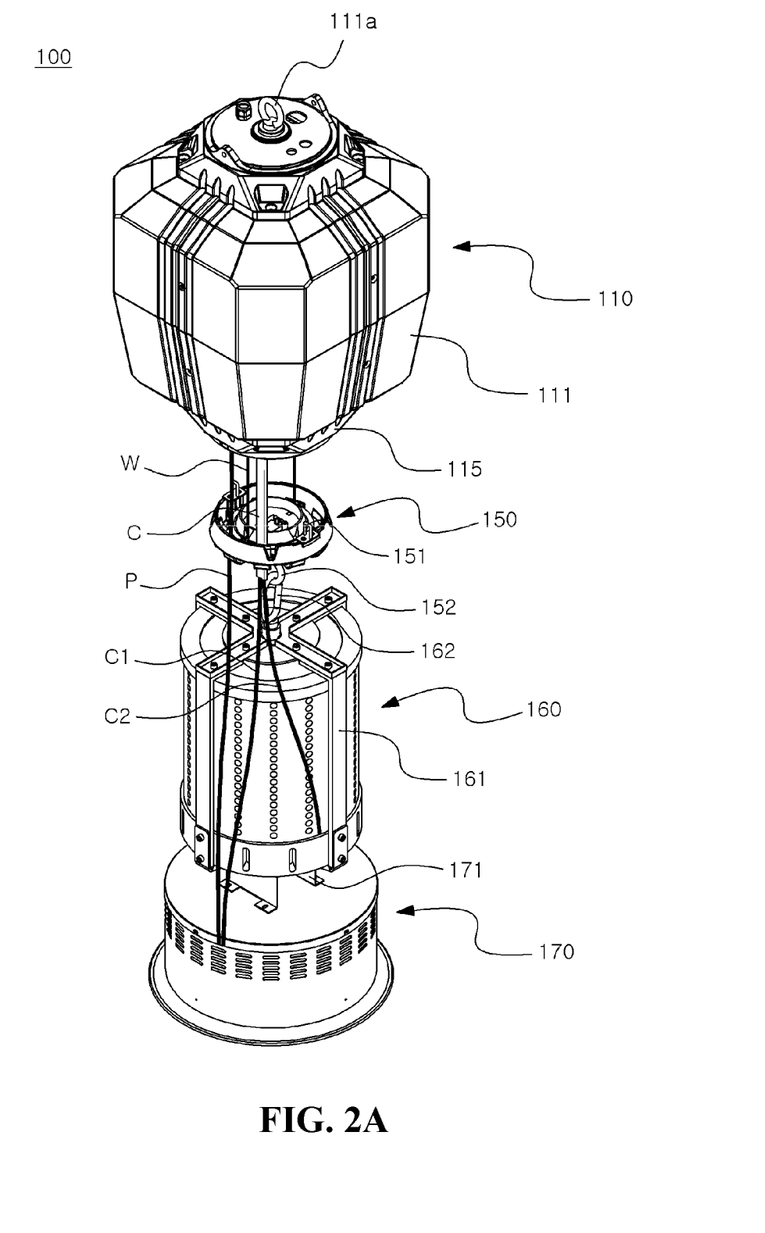
FIGS. 2A and 2B are perspective views illustrating a state in which the luminaire of FIG. 1 is moved down.
Figure 2B:
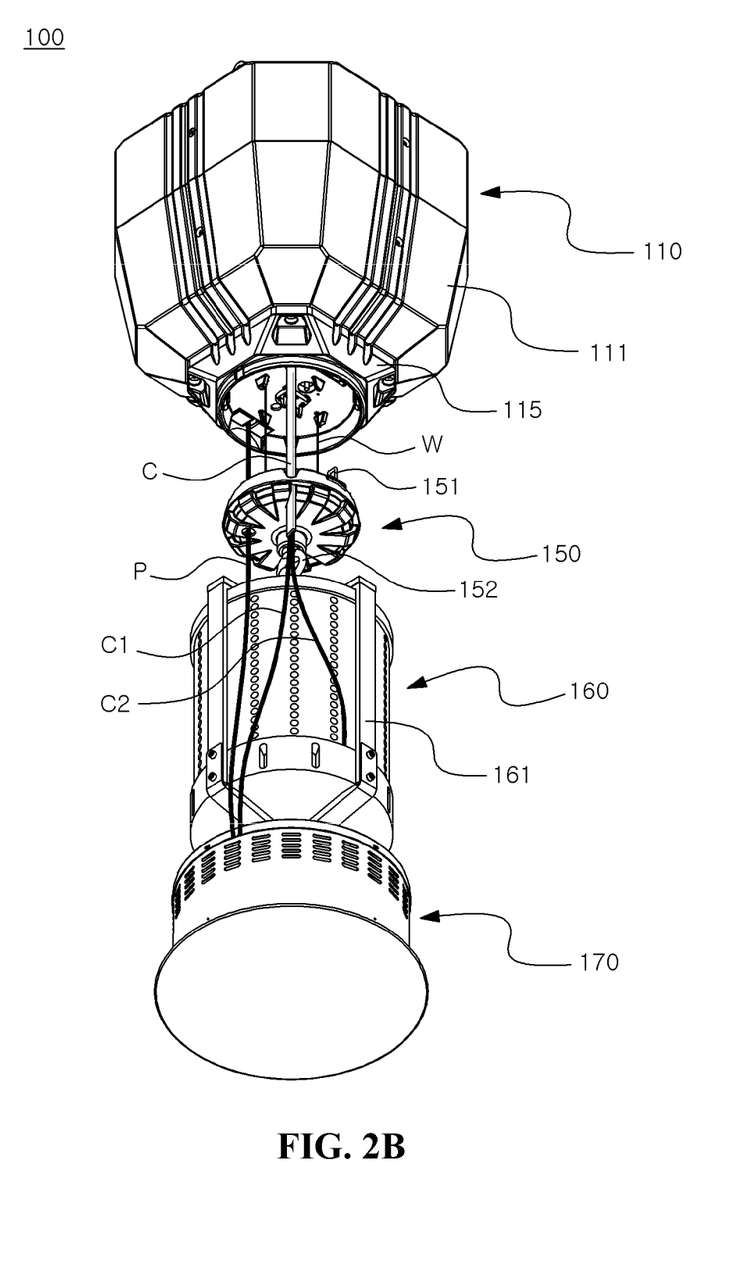
Figure 3:
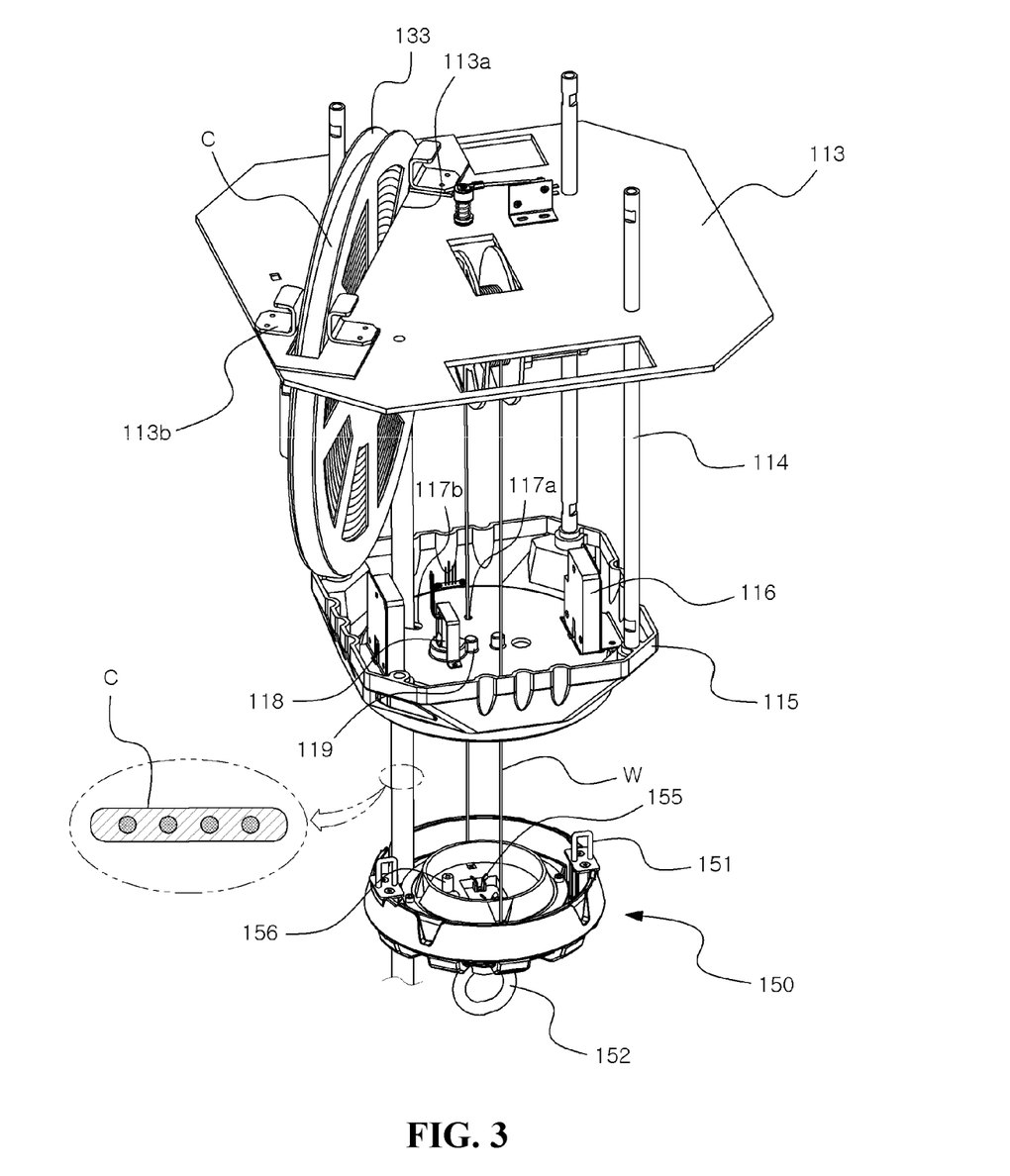
FIGS. 3 to 5 are views illustrating an internal structure in which a casing of a body unit is removed from FIG. 1.
Figure 4:
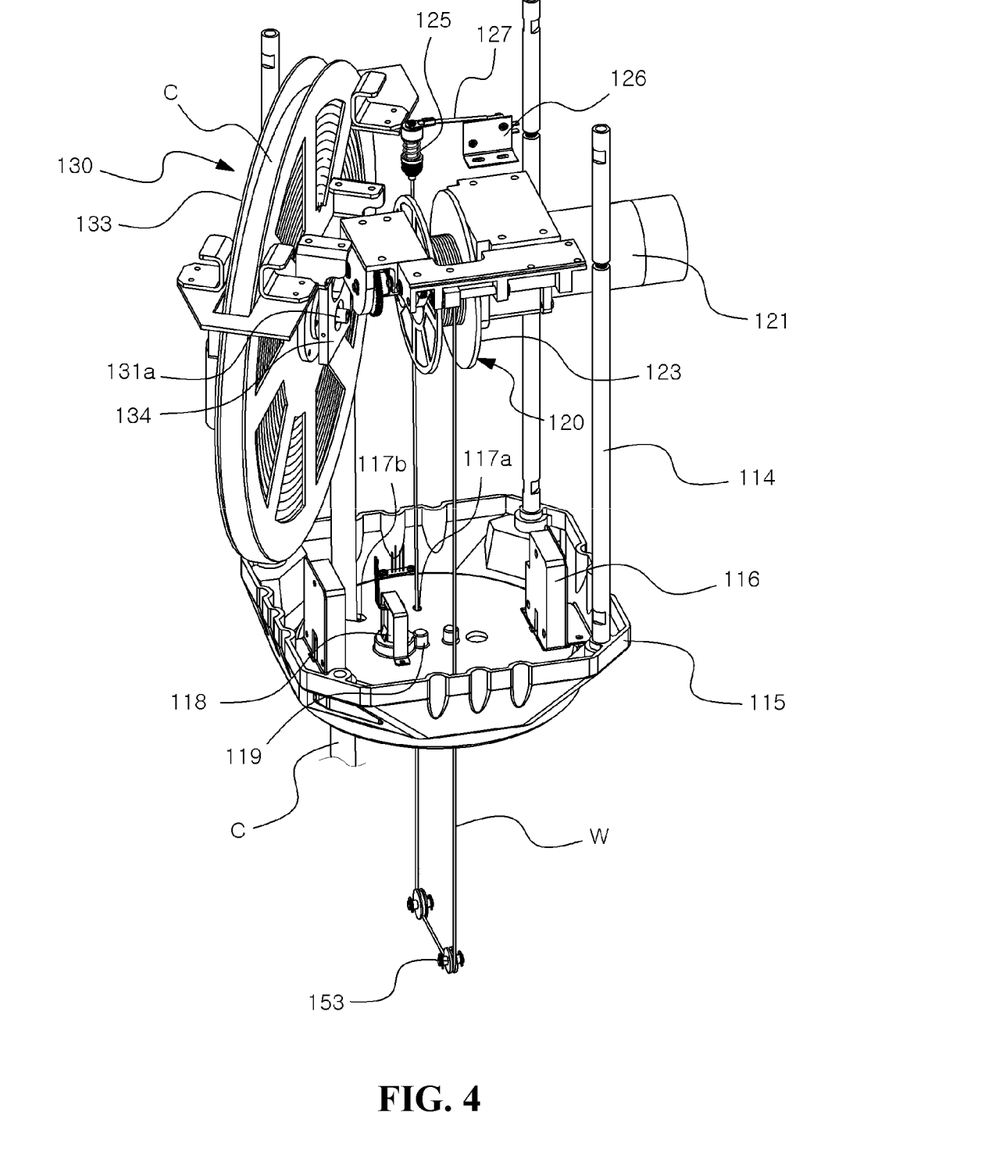
Figure 5:
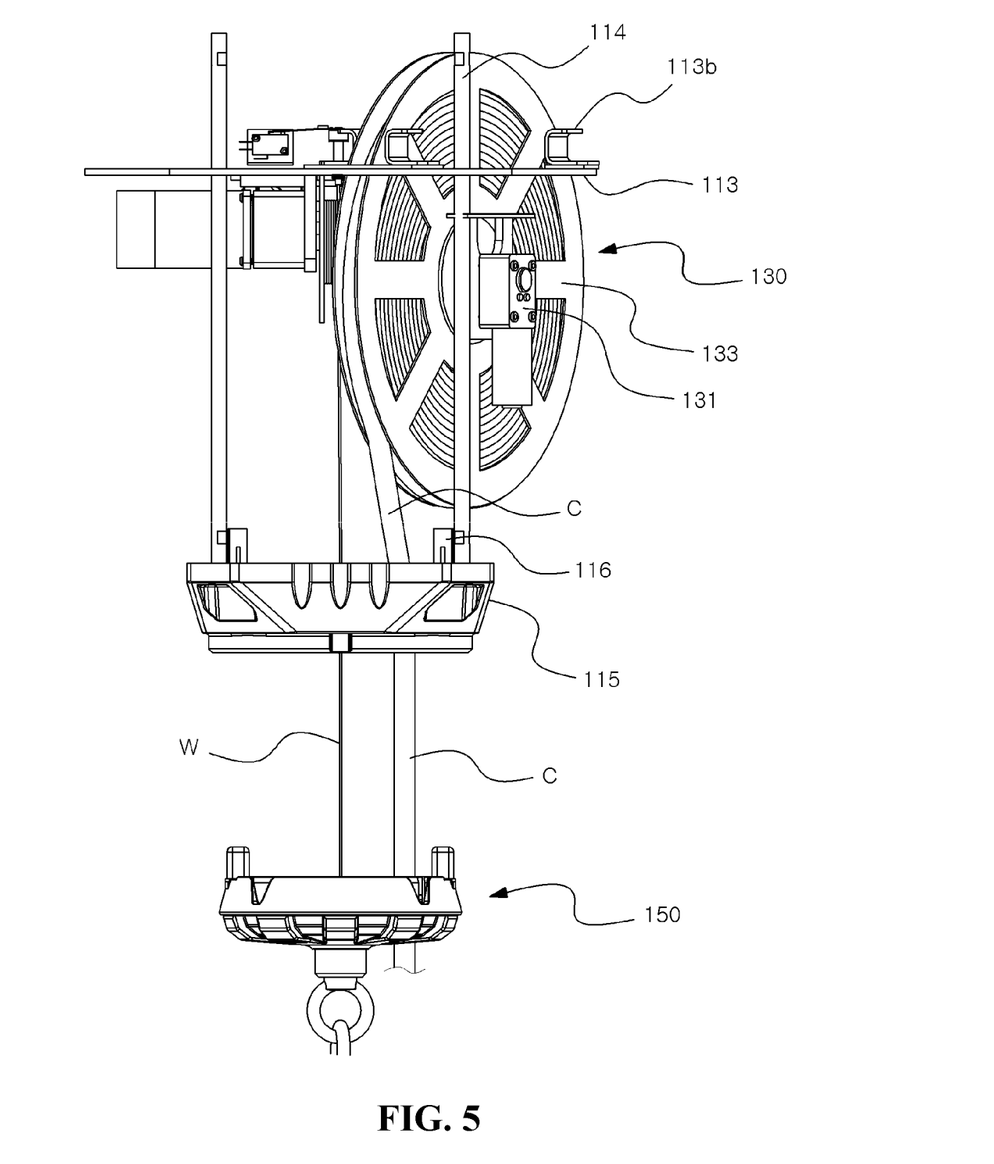
Figure 6:
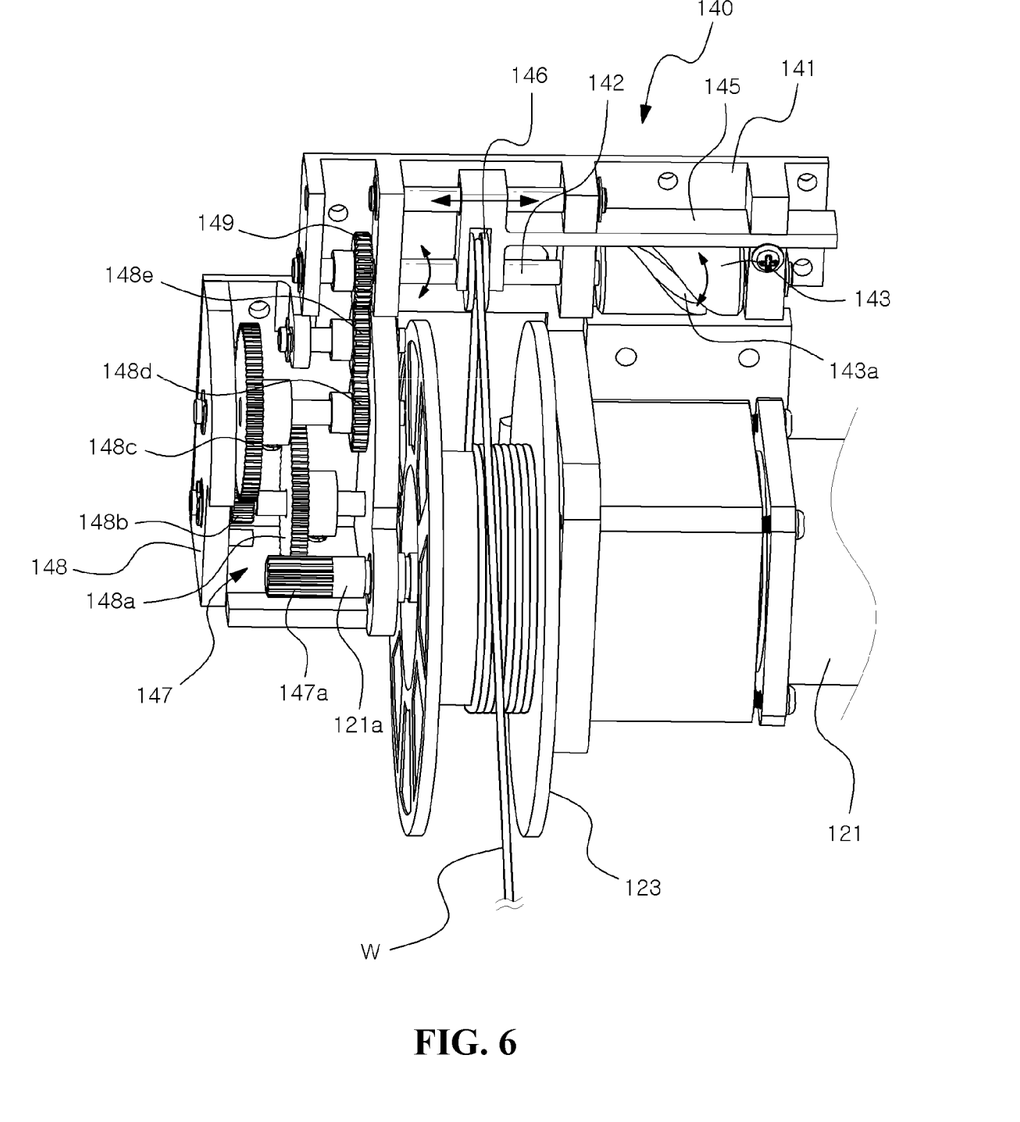
FIGS. 6 to 8 are views illustrating a wire alignment device and a gear module of the present invention.
Figure 7:
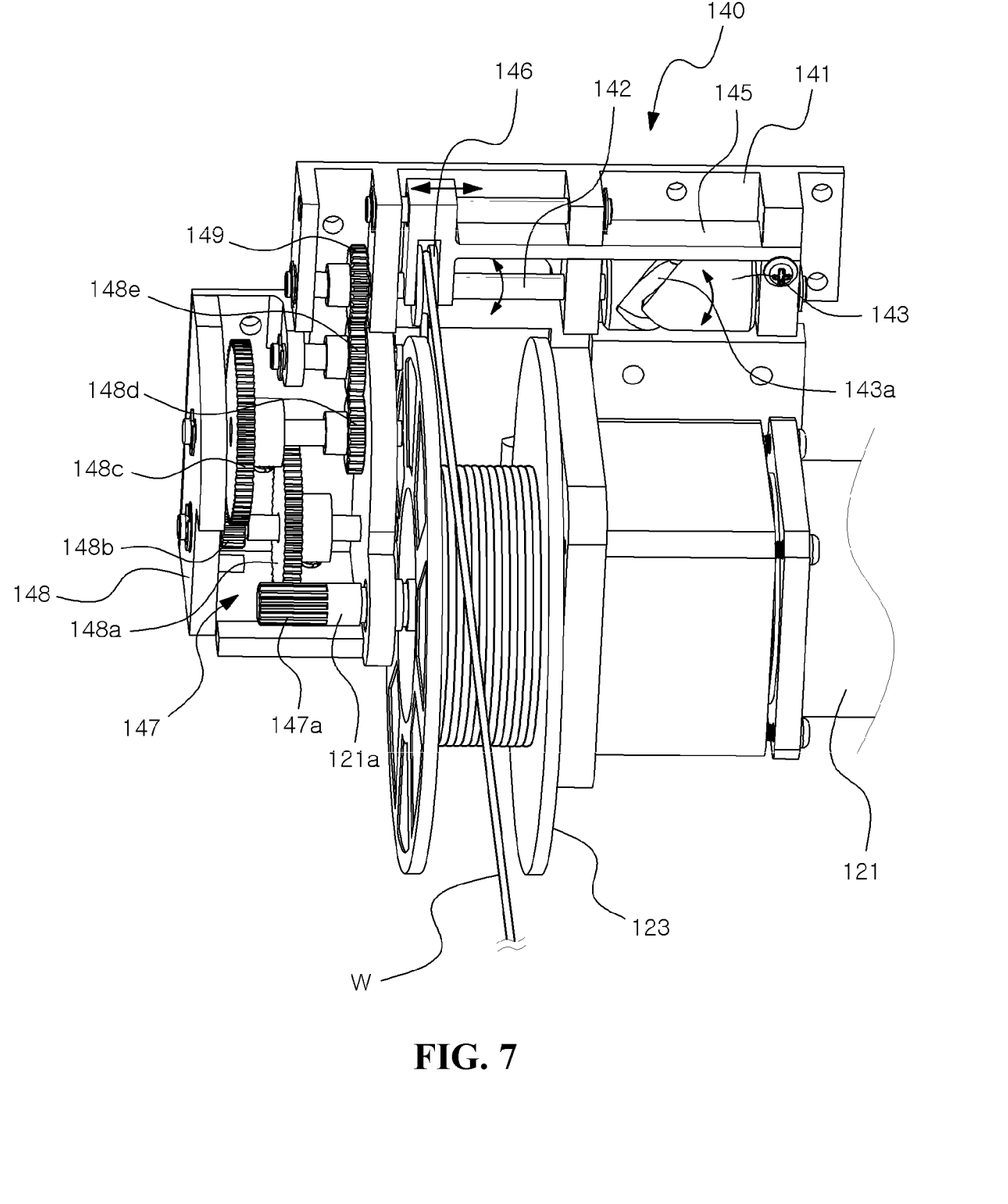
Figure 8:
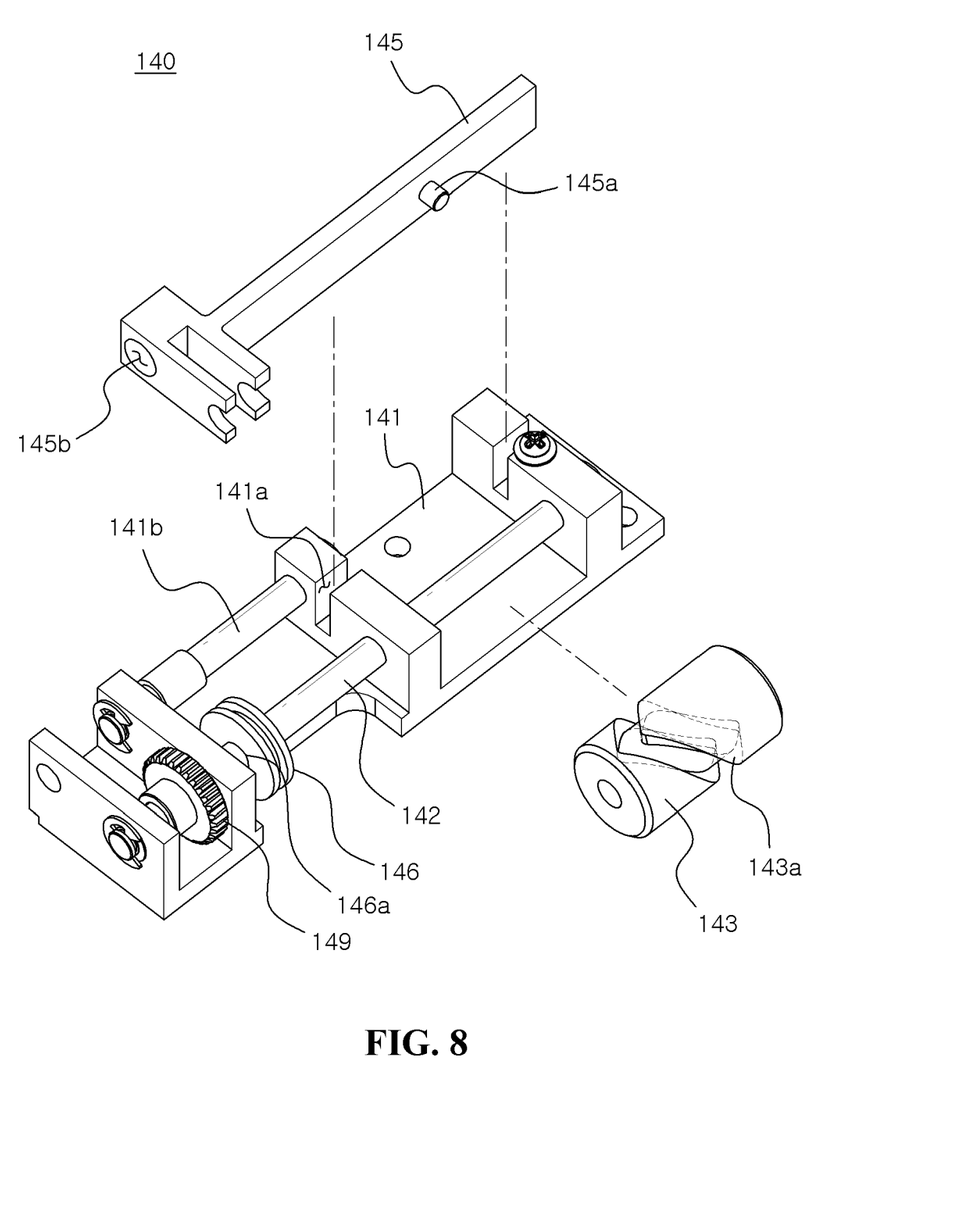
Figure 9:
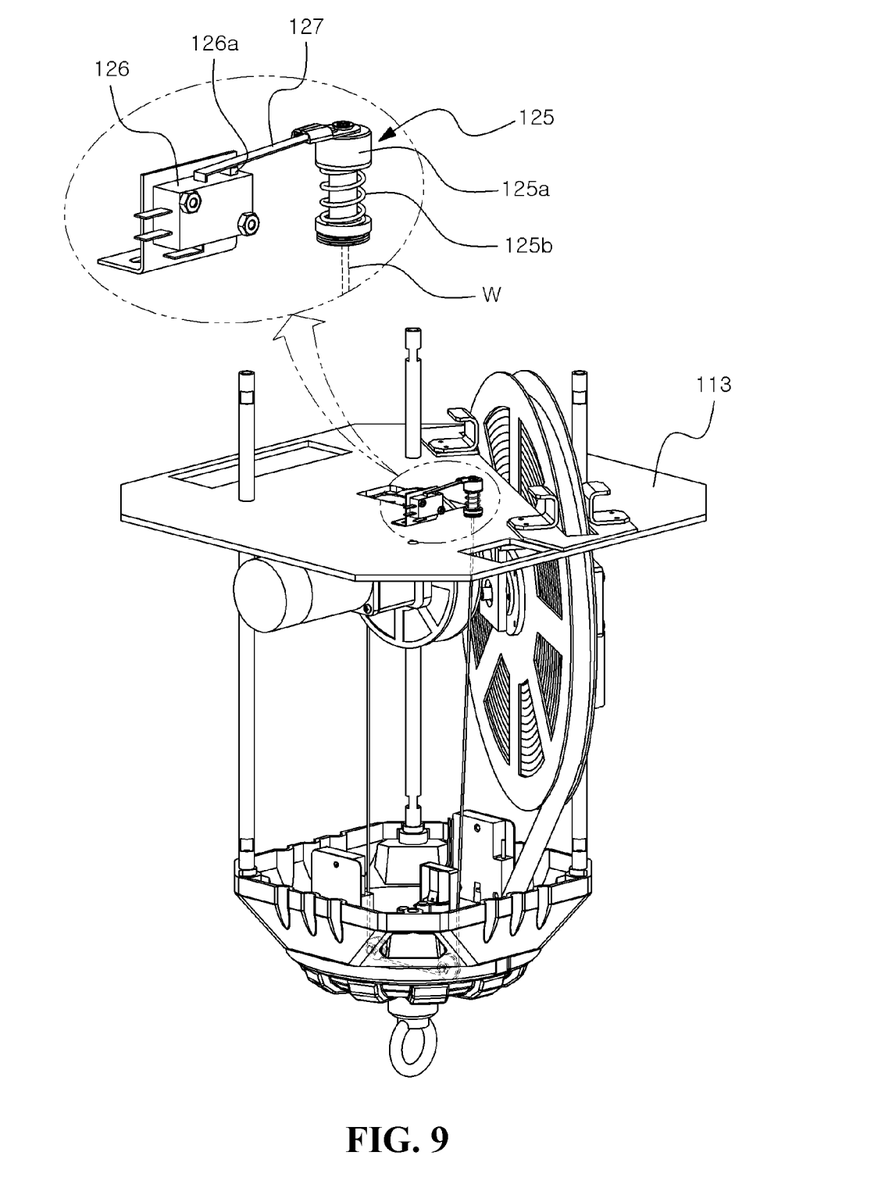
FIGS. 9 and 10A-10B are views illustrating a structure of a weight sensing spring of the present invention.
Figure 10A:
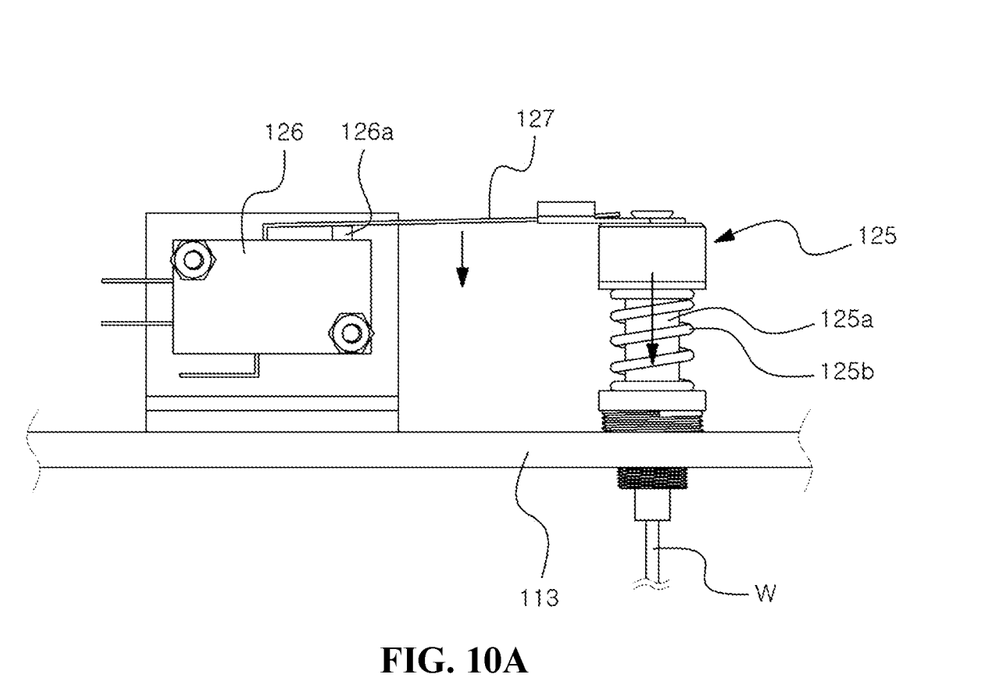
Figure 10B:
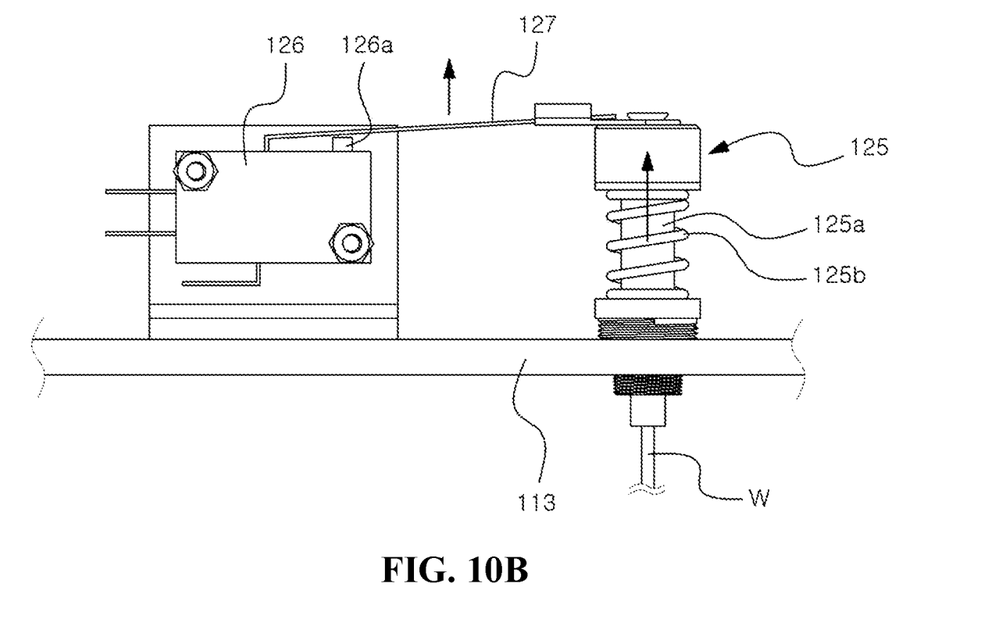

The present invention may further include a wire alignment device 140 configured to align the wire W to the wire wheel 123, and a gear module 147 configured to drive the wire alignment device 140 by transmitting the rotational force of the first drive motor 121 to the wire alignment device 140, as illustrated in FIGS. 6 to 8.

The wire alignment device 140 of the present invention serves to constantly align the wire W by winding or unwinding it while reciprocating from side to side within a range corresponding to the width of the wire wheel 123 when the wire W is wound or unwound.

The wire alignment device 140 includes a support body 141, a rotary shaft 142 installed in the longitudinal direction of the support body 141, a cylindrical rotating drum 143a having a guide groove 143a form on the outer peripheral surface thereof and installed on the rotary shaft 142, a moving body 145 installed on one side of the rotary shaft 142 and having a protrusion fitted into the guide groove 143a, a support roller 146 disposed at one end of the moving body 145 to support the wire W drawn from the wire wheel 123 and having a through-hole 146a formed therein to pass the rotary shaft 142 therethrough, and a gear section 149 formed at one end of the rotary shaft 142.

The support body 141 is fitted with the moving body 145 and has a fitting groove 141a formed therein to guide the movement thereof. A guide bar 141b is installed at one side of the support body 141, and the moving body 145 has a guide bar fitting hole 145b formed for insertion of the guide bar 141b.

When the cylindrical rotating drum 143 rotates together with the rotary shaft 142, the protrusion 145a is pushed and moved as guided by the guide groove 143a to thereby reciprocate from side to side, and the wire W seated on the support roller 146 is also aligned with the wire wheel 123 while reciprocating from side to side.

The gear module 147 of the present invention transmits the rotational force of the first drive motor 121 to the wire alignment device 140, and may include a driving gear 147a extending from a drive shaft 121a of the first drive motor 121, at least one driven gear 148a to 148e engaged with the driving gear 147a, and the gear section 149 installed at one side of the wire alignment device 140.

When the first drive motor 121 rotates, the rotational force thereof is sequentially transmitted to the driving gear 147a, the driven gears 148a to 148e, and the gear section 149 to finally rotate the cylindrical rotating drum 143.

Figure 12:
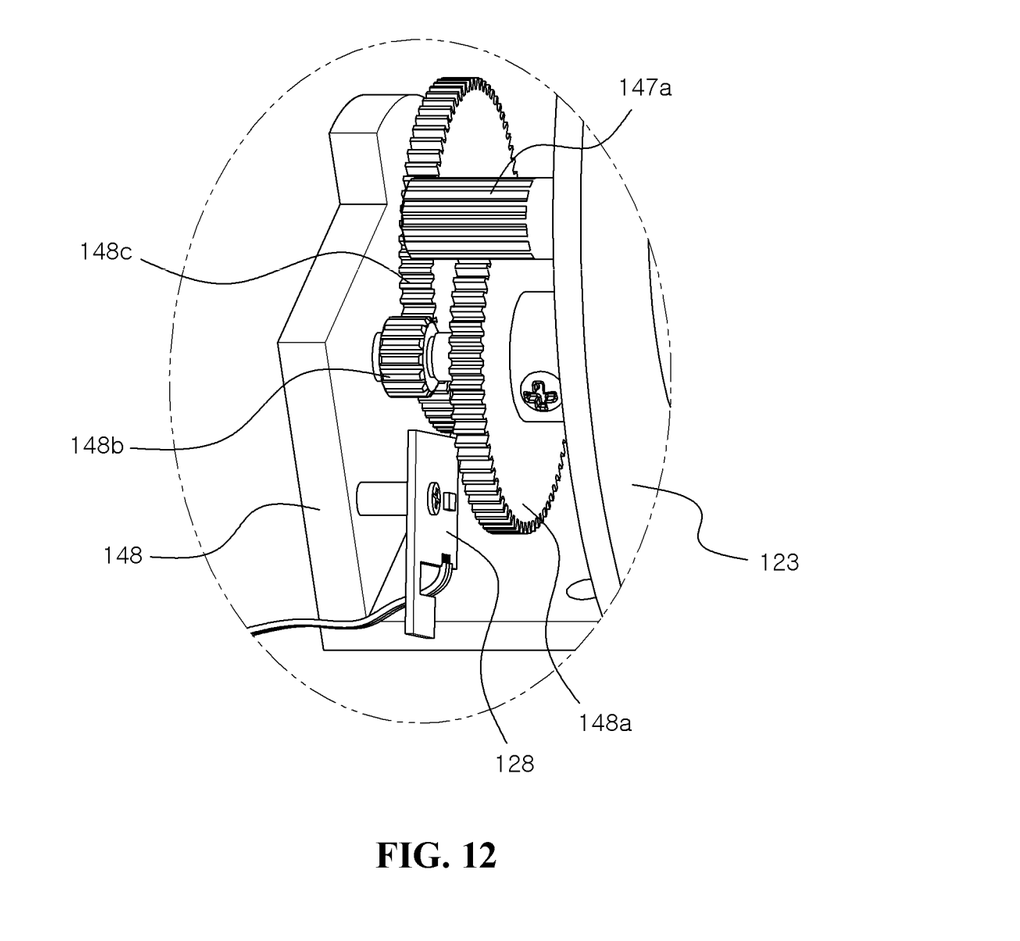
FIGS. 12 and 13 are views illustrating a structure of a magnetic Hall sensor of the present invention.
Figure 13:
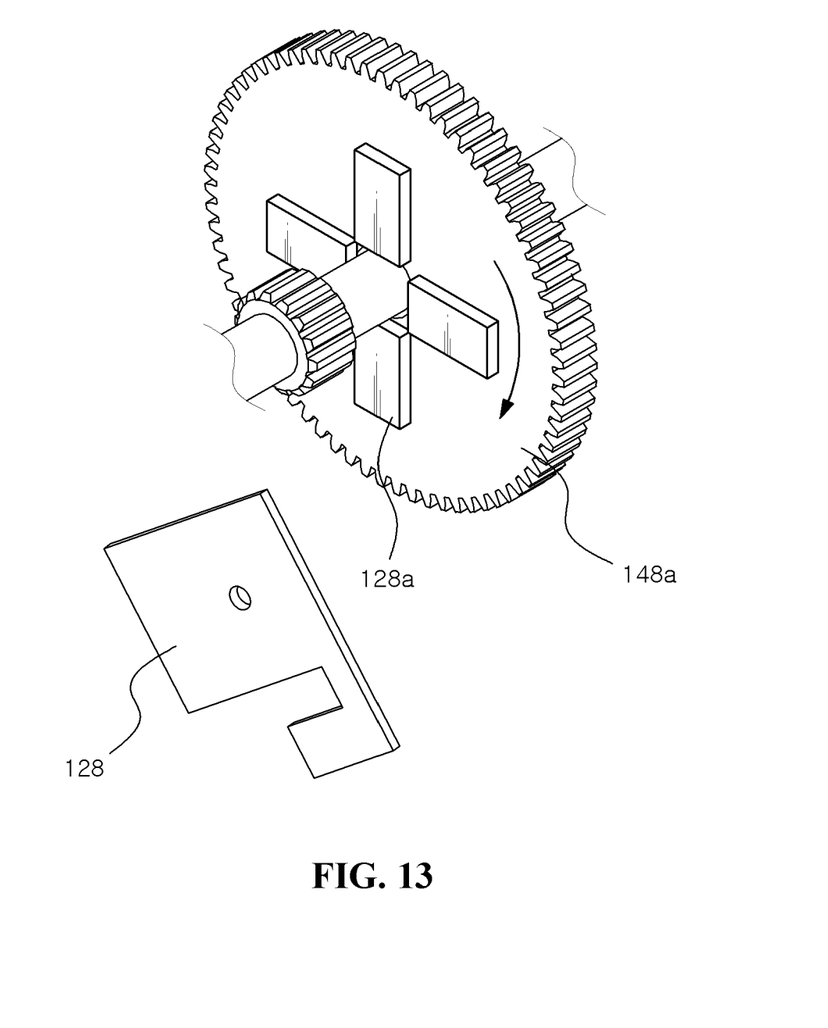

The present invention may further include a magnetic Hall sensor 128 as illustrated in FIGS. 12 and 13.

The magnetic Hall sensor 128 is installed on one side of the wire elevating unit 120 in the body unit 110, and a plurality of magnetic switches 128a are installed on the driven gear 148a installed at one end of the first drive motor 121 to detect the rotational speed or number of revolutions of the first drive motor, thereby enabling the first drive motor to be controlled to automatically stop in case of an emergency or to be controlled to set a height to which the electronic device and the luminaire are moved downwards.

The present invention may further include a controller configured to control the overall operating state, such as supply and interruption of power to each component of the luminaire apparatus.

As is apparent from the above description, according to the present invention, it is possible to perform replacement of light bulbs, troubleshooting, or maintenance by vertically moving the luminaire installed on the ceiling through the wire, as well as to use the luminaire at a height desired by the user by installing the elevatable power cable to the luminaire.

In addition, it is possible to supply power to the luminaire through the elevatable power cable while supplying power to the luminaire through the separate power line when the luminaire is fully moved up so that the connection unit is coupled to the body unit, thereby preventing accidents such as fire due to excessive use of electric power through the wound power cable.

Furthermore, it is possible to improve an enclosed indoor environment such as a gymnasium by installing the electronic device such as the air cleaner.

The present invention is not limited to the above effects, and other effects of the present invention will be clearly understood by those skilled in the art to which the present invention pertains from the above description.

Although an embodiment of the luminaire apparatus according to the present invention has been described, it is merely an exemplary embodiment therefor. Accordingly, it will be apparent to those skilled in the art that various variations and modifications may be made without departing from the spirit and scope of the invention as defined in the following claims. Therefore, these variations and modifications fall within the scope of the invention.

The invention claimed is:

1. A luminaire apparatus having an air cleaner attached thereto, which is connected by wires and cables so as to be vertically movable, the luminaire apparatus comprising:
  a body unit comprising a casing installed on a structure and a lower casing coupled to a lower portion of the casing;
  a wire elevating unit installed in the body unit;
  a power cable elevating unit installed in the body unit;
  a connection unit installed beneath the body unit so as to be vertically movable;
  an air cleaner coupled to an underside of the connection unit;
  a luminaire coupled to an underside of the air cleaner;
  a wire configured to connect the wire elevating unit to the connection unit in order to vertically move the air cleaner and the luminaire; and
  a power cable having one end connected to the power cable elevating unit and the other end connected to the air cleaner and the luminaire, thereby enabling supply of power to the air cleaner, which is capable of moving vertically together with the luminaire, even when the air cleaner and the luminaire are moved up and down, wherein:

the lower casing and the connection unit have a plug supplied with power from the outside and a socket to which the plug is fitted, respectively;

when the connection unit moves up to be coupled to the lower casing, the plug is connected to the socket so that external power is supplied to the luminaire through a power line connected to the socket and the luminaire;

the power cable includes a pair of first power cables connected to the air cleaner and a pair of second power cables connected to the luminaire; and the power cable is controlled so that power is supplied to the luminaire through the second power cables only when the connection unit moves down and the plug is separated from the socket so that the supply of power to the luminaire through the power line is cut off.

2. The luminaire apparatus according to claim 1, wherein:

the body unit further comprises a support panel configured to divide the casing into upper and lower portions;

the support panel is provided with an insertion port into which a portion of a power cable wheel is inserted, and has a plurality of wheel shaking prevention guide members installed on left and right sides of the insertion port in order to prevent the power cable wheel from shaking from side to side during rotation;

the support panel is equipped with a weight sensing spring coupled to one end of the wire, a micro switch configured to turn on and off a first or second drive motor, and an operation bar having one end fixed to an upper end of the weight sensing spring and the other end pressing a motor control button provided on an upper end of the micro switch;

when weights of the air cleaner and the luminaire are applied to the weight sensing spring through the wire, the operation bar presses the motor control button of the micro switch while the weight sensing spring is contracted, thereby keeping the first and second drive motors operated; and when the weights of the air cleaner and the luminaire are not applied to the weight sensing spring through the wire or is reduced, the operation bar does not press the motor control button of the micro switch while the contracted weight sensing spring is extended, thereby controlling the first and second drive motors so as not to operate.

3. A luminaire apparatus having an air cleaner attached thereto, which is connected by wires and cables so as to be vertically movable, the luminaire apparatus comprising:

a body unit comprising a casing installed on a structure and a lower casing coupled to a lower portion of the casing;

a wire elevating unit installed in the body unit;

a power cable elevating unit installed in the body unit;

a connection unit installed beneath the body unit so as to be vertically movable;

an air cleaner coupled to an underside of the connection unit;

a luminaire coupled to an underside of the air cleaner;

a wire configured to connect the wire elevating unit to the connection unit in order to vertically move the air cleaner and the luminaire; and a power cable having one end connected to the power cable elevating unit and the other end connected to the air cleaner and the luminaire, thereby enabling supply of power to the air cleaner, which is capable of moving vertically together with the luminaire, even when the air cleaner and the luminaire are moved up and down, wherein:

the wire elevating unit comprises a first drive motor installed in the body unit and a wire wheel rotatably connected to the first drive motor, the wire being wound around the wire wheel;

the power cable elevating unit comprises a second drive motor installed in the body unit and a power cable wheel rotatably connected to the second drive motor, the power cable being wound around the power cable wheel; and the second drive motor for rotating the power cable wheel is controlled to rotate in response to a rotational speed or number of revolutions of the first drive motor.

4. A luminaire apparatus having an air cleaner attached thereto, which is connected by wires and cables so as to be vertically movable, the luminaire apparatus comprising:

a body unit comprising a casing installed on a structure and a lower casing coupled to a lower portion of the casing;

a wire elevating unit installed in the body unit;

a power cable elevating unit installed in the body unit;

a connection unit installed beneath the body unit so as to be vertically movable;

an air cleaner coupled to an underside of the connection unit;

a luminaire coupled to an underside of the air cleaner;

a wire configured to connect the wire elevating unit to the connection unit in order to vertically move the air cleaner and the luminaire; and a power cable having one end connected to the power cable elevating unit and the other end connected to the air cleaner and the luminaire, thereby enabling supply of power to the air cleaner, which is capable of moving vertically together with the luminaire, even when the air cleaner and the luminaire are moved up and down, wherein:

the wire elevating unit has a magnetic Hall sensor installed on one side thereof, and a plurality of magnetic switches are installed on a gear section installed at one end of a first drive motor to detect a rotational speed or number of revolutions of the first drive motor, thereby enabling the first drive motor to be controlled to automatically stop in case of an emergency or to be controlled to set a height to which the air cleaner and the luminaire are moved downwards; and a second drive motor for rotating a power cable wheel is controlled to rotate in response to the rotational speed or number of revolutions of the first drive motor detected by the magnetic Hall sensor.

* * * * *